US010135953B2

(12) United States Patent
Pantea et al.

(10) Patent No.: US 10,135,953 B2
(45) Date of Patent: *Nov. 20, 2018

(54) SELF-DESCRIBING DIAGNOSTIC DATA FOR PRESENTATION ON MOBILE DEVICES

(71) Applicant: Rockwell Automation Technologies, Inc., Mayfield Heights, OH (US)

(72) Inventors: Adrian D. Pantea, Scottsdale, AZ (US); Kenneth S. Plache, Scottsdale, AZ (US); Andrew J. Keizer, Peoria, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/892,050

(22) Filed: Feb. 8, 2018

(65) Prior Publication Data

US 2018/0167494 A1  Jun. 14, 2018

Related U.S. Application Data

(63) Continuation of application No. 14/929,580, filed on Nov. 2, 2015, now Pat. No. 9,923,993.

(51) Int. Cl.
*G06F 15/16* (2006.01)
*H04L 29/06* (2006.01)
(Continued)

(52) U.S. Cl.
CPC ............ *H04L 67/42* (2013.01); *G06F 3/1454* (2013.01); *G06F 8/38* (2013.01); *G06F 9/4415* (2013.01);
(Continued)

(58) Field of Classification Search
CPC ....... H04L 67/42; G06F 9/451; G06F 9/4415; G06F 17/30572; G06F 3/1454;
(Continued)

(56) References Cited

U.S. PATENT DOCUMENTS 8,583,618 B2 * 11/2013 Lemaire ............ G06F 17/30991
707/706
2002/0006265 A1 * 1/2002 Beyrouti ............... G11B 27/002
386/233
(Continued)

OTHER PUBLICATIONS

European Search Report for European Patent Application No. EP16196908.4 dated Mar. 10, 2017.
(Continued)

*Primary Examiner* — Brian Whipple
(74) *Attorney, Agent, or Firm* — Amin, Turocy & Watson, LLP

(57) ABSTRACT

Industrial devices are configured to provide their associated industrial data to client-side user interface applications in a self-describing manner that instructs the interface applications how the data is to be rendered. In response to a request for a data item from a user interface application, the industrial device sends the requested data item together with presentation metadata that identifies a widget or graphical objects to be used by the interface application to render the data item on a user interface. By providing the industrial data in a self-describing manner, additional data or services can be added to the industrial device without requiring a corresponding update to the client-side interface application.

20 Claims, 16 Drawing Sheets

(51) Int. Cl.
    *G06F 3/14*      (2006.01)
    *G06F 8/38*      (2018.01)
    *G06F 17/30*     (2006.01)
    *G06T 11/20*     (2006.01)
    *G06F 9/4401*    (2018.01)
    *G06F 9/451*     (2018.01)

(52) U.S. Cl.
    CPC ........ *G06F 9/451* (2018.02); *G06F 17/30572* (2013.01); *G06T 11/206* (2013.01); *G09G 2354/00* (2013.01); *G09G 2370/04* (2013.01)

(58) Field of Classification Search
    CPC ..... G06F 8/38; G06T 11/206; G09G 2370/04; G09G 2354/00
    See application file for complete search history.

(56) References Cited

U.S. PATENT DOCUMENTS

| | | |
|---|---|---|
| 2004/0205516 A1 | 10/2004 | Tufts |
| 2008/0222273 A1 | 9/2008 | Lakshmanan et al. |
| 2010/0188674 A1* | 7/2010 | Tomizawa ......... G06K 9/00449 358/1.9 |
| 2011/0029499 A1* | 2/2011 | Urushihara ....... G06F 17/30038 707/705 |
| 2013/0226992 A1 | 8/2013 | Bapst et al. |
| 2013/0290856 A1 | 10/2013 | Beveridge et al. |
| 2014/0082511 A1 | 3/2014 | Weissberg et al. |
| 2014/0096014 A1 | 4/2014 | Johnson et al. |
| 2014/0122729 A1 | 5/2014 | Hon et al. |
| 2015/0007094 A1 | 1/2015 | Laturner et al. |
| 2015/0277404 A1 | 10/2015 | Maturana et al. |
| 2016/0205177 A1 | 7/2016 | Bapst et al. |

OTHER PUBLICATIONS

Office Action for U.S. Appl. No. 14/929,580 dated Aug. 14, 2017, 24 pages.
Notice of Allowance for U.S. Appl. No. 14/929,580 dated Dec. 4, 2017, 15 pages.

* cited by examiner

SELF-DESCRIBING DIAGNOSTIC DATA FOR PRESENTATION ON MOBILE DEVICES

CROSS-REFERENCE TO RELATED APPLICATIONS

This application is a continuation of, and claims priority to, U.S. patent application Ser. No. 14/929,580, filed on Nov. 2, 2015, and entitled "SELF-DESCRIBING DIAGNOSTIC DATA FOR PRESENTATION ON MOBILE DEVICES," the entirety of which is incorporated herein by reference.

BACKGROUND

The subject matter disclosed herein relates generally to industrial automation systems, and, more particularly, to delivery of industrial data to a graphical interface in a self-describing manner that instructs the graphical interface how the industrial data is to be rendered

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an industrial device is provided, comprising an interface server component configured to receive a request for a data item stored on the memory from a client device; and a metadata retrieval component configured to, in response to the request, send the data item and presentation metadata to the client device, wherein the presentation metadata identifies a graphical format to be used to render the data item on the client device.

Also, one or more embodiments provide a method for delivering industrial data to a graphical interface, where the method comprises receiving, by a system comprising a processor, a request from a client device for a data item generated by an industrial device; and in response to the receiving: generating a data packet comprising a value associated with the data item and presentation metadata indicating a graphical format for presentation of the data item on the client device, and sending the data packet to the client device.

Also, according to one or more embodiments, a non-transitory computer-readable medium is provided having stored thereon instructions that, in response to execution, cause a system to perform operations, the operations comprising receiving a request from a client device for a data item maintained in a memory of an industrial device; and in response to the receiving, send the data item and presentation metadata to the client device, wherein the presentation metadata identifies a graphical object to be used to render the data item on the client device.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
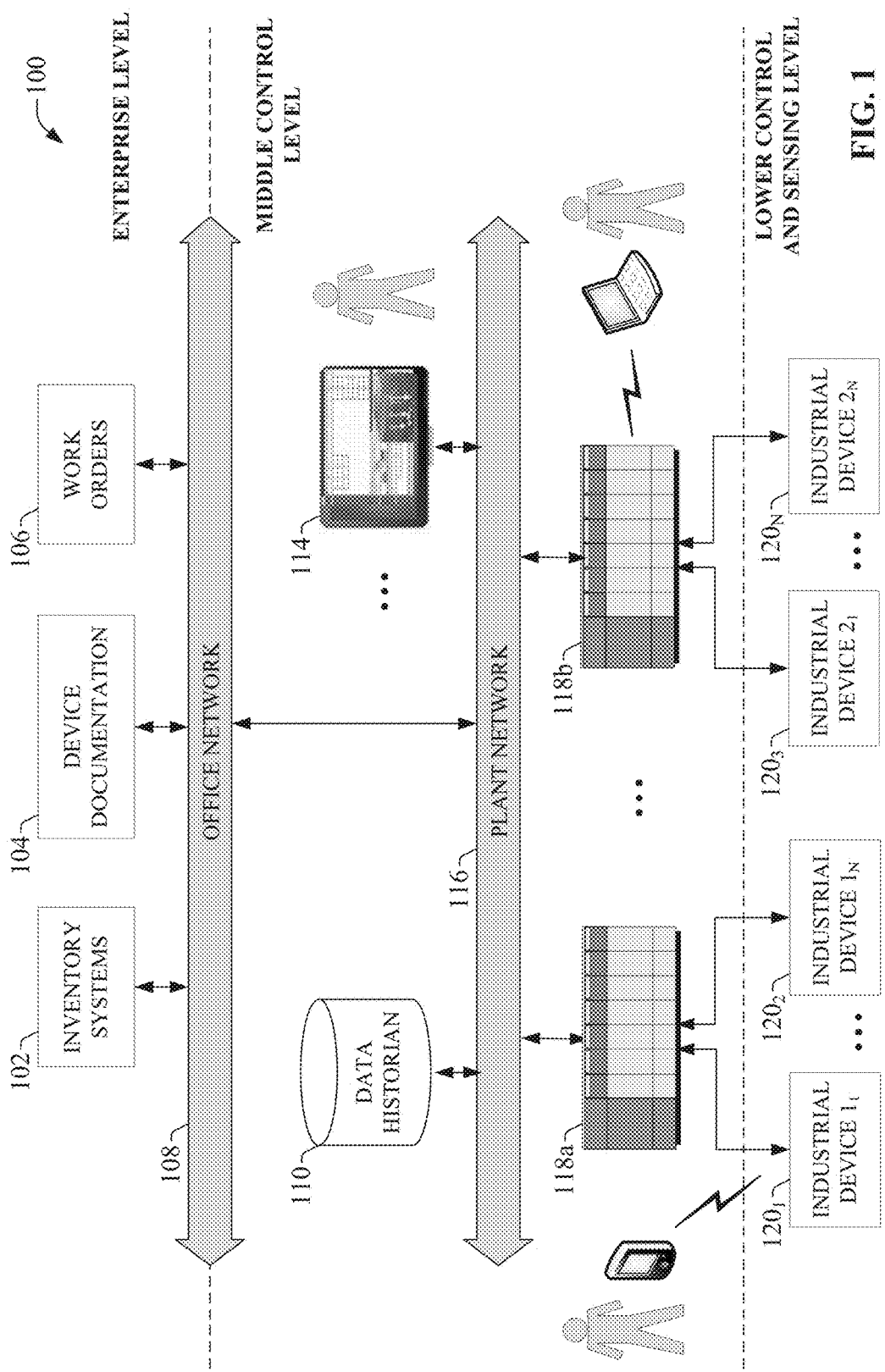
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, and other industrial devices are central to the operation of modern automation systems. Industrial controllers interact with field devices on the plant floor to control automated processes relating to such objectives as product manufacture, material handling, batch processing, supervisory control, and other such applications. These industrial controllers store and execute user-defined control programs to effect decision-making in connection with the controlled process. Other devices, such as motor drives and telemetry devices, serve to control or measure aspects of the industrial processes, either independently of or in conjunction with the industrial controllers.

FIG. 1 is a block diagram of an example industrial control environment 100. In this example, a number of industrial controllers 118 e.g., programmable logic controller (PLCs) or other types of automation controllers—are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise soft controllers executed on a personal computer or other hardware platform, or hybrid devices that combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Figure 2:
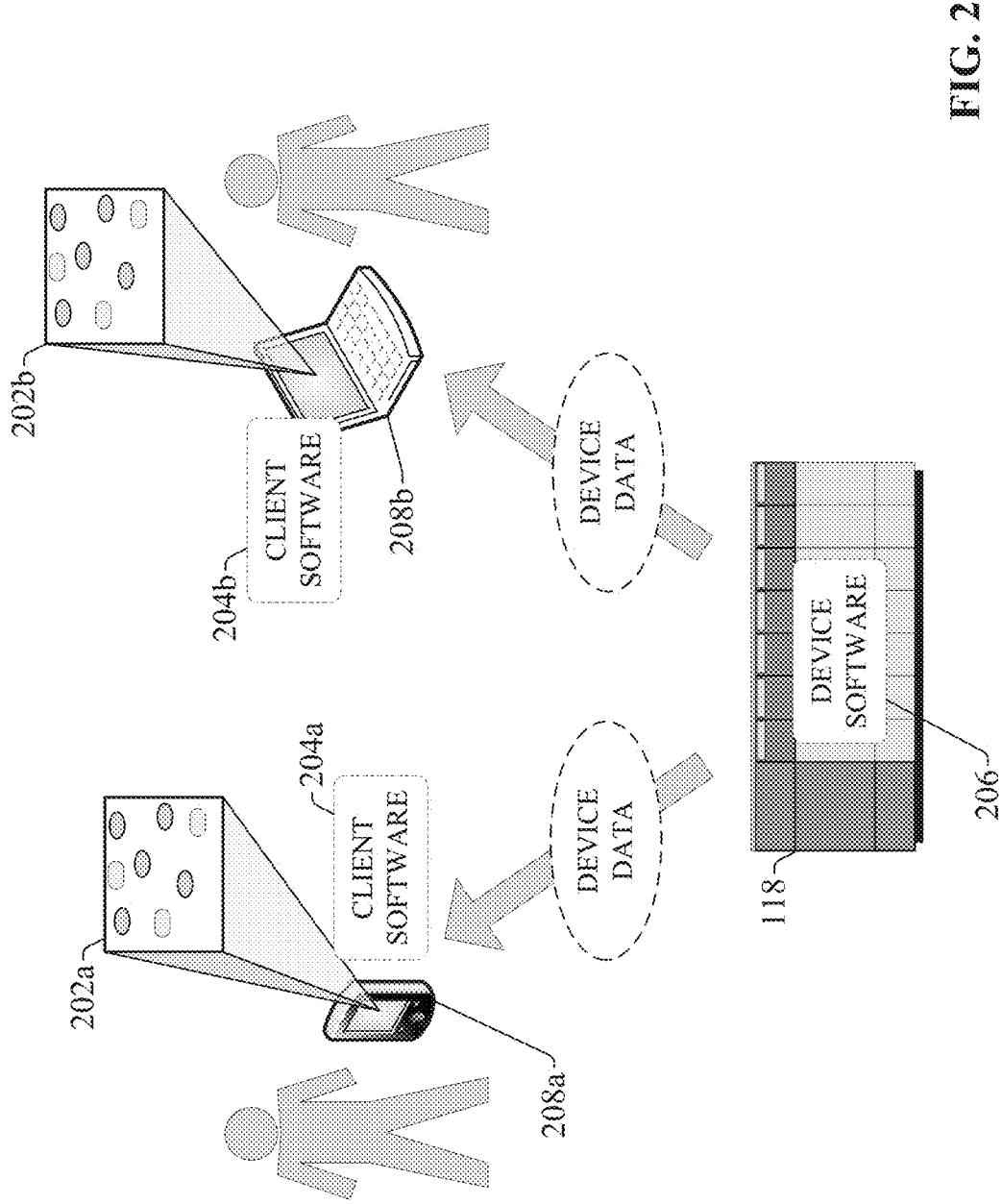
FIG. 2 is a diagram illustrating retrieval of device data from an industrial controller.

Many of the industrial devices that make up the industrial control environment generate and store operational and/or diagnostic data that can be accessed and viewed by client-side graphical interfaces. FIG. 2 is a diagram illustrating retrieval of device data from an industrial controller 118. In this example, device software 206 executing on the industrial controller 118 maintains a set of device data in local storage. This device data can include, for example, operational or status data relating to a machine or process being controlled by the industrial controller 118. Values of this operational and/or status data can be set by the user-defined control program (e.g., ladder logic, sequential function chart, etc.) being executed by the industrial controller 118. Example operational and status data can include measured values (e.g., temperatures, pressures, speed, positions, etc.), product counts, machine statuses (e.g., running, faulted, idle, etc.), alarm conditions, etc. The device data may also include internal diagnostic information that is native to the device, including but not limited to processor load, storage usage, internal device faults or statuses, network connection statistics, or other such information.

Some or all of this device data can be made available for viewing on client software executing on a user's client device or on an HMI terminal. In the example depicted in FIG. 2, client devices 208*a* and 208*b*—which may be laptop computers, tablet computers, mobile phones, desktop computers, etc.—are each installed with client software 204*a* and 204*b*. The client software 204*a* and 204*b* can be configured to communicate with the industrial controller 118 (or other industrial device) using native communication capabilities of the respective client devices 208*a* and 208*b* on which the client software is running. For example, client devices 208*a* and 208*b* can communicatively interface with industrial controller 118 over a wireless connection (e.g., a near field connection) or a wired connection (e.g., over a serial cable, an Ethernet cable, a universal serial port cable, etc.). In some scenarios, industrial controller 118 may be configured to verify an authorization of the client device prior to allowing the client device to access its stored device data. Client software 204*a* and 204*b* is configured to display selected items of device data from the industrial controller on one or more graphical interface displays. Accordingly, once the client device is connected to the industrial controller 118, the client software can retrieve one or more of the selected items of device data from the industrial controller's memory (e.g., a data table maintained by the industrial controller) and render the selected data items on one or more of the pre-defined graphical interface screens. The graphical interface displays defined in the client software are configured to render each item of device data on the client device in a format defined in the client software configuration. For example, a given graphical interface display may be configured to display a processor usage percentage read from the industrial controller as an animated bar having a fill amount corresponding to the processor usage, and to display a machine fault status as a color-animated light indicator. These selected formats are typically pre-defined in the client software. The many and varied industrial devices throughout the control environment can provide diagnostic, operational, and status data in disparate and heterogeneous representations.

Typically, when changes are made to the diagnostic, operational, or status information on an industrial device—e.g., when a new service or new data items are added to an industrial controller, drive, or other device—the corresponding client interface software must often be updated to accommodate the newly available device data, and to define a graphical representation for rendering the new data. This tight coupling between the data/services supported by the industrial device and the client-side interface application used to visualize the device data can create logistical hardships, since the versions of the client-side software on all client devices that will be accessing the device data must be coordinated with updates made to the industrial devices and their associated services.

To address these and other issues, one or more embodiments of the present disclosure provide industrial devices that support self-describing device data. According to one or more embodiments, an industrial device (e.g., industrial controller, motor drive, meter, etc.) is capable of providing device data together with associated metadata that conveys to the client-side interface application how the device data is to be rendered on a display. The metadata can identify a user interface presentation—e.g., a display format, a graphical object, a widget, etc.—that is bound to a particular item of device data. In some scenarios, the metadata may also identify an item of device data that is to be localized using a look-up key on the client-side interface application.

The client-side interface application can be configured to adapt its interface displays based on the presentation information contained in the metadata for each device data item to be rendered. For example, the interface application can maintain a library of widgets or other graphical objects. The presentation metadata associated with a retrieved item of device data can identify the particular widget to be used to render the data item. When the client-side interface application retrieves the data item from the industrial device, the application can read the metadata, retrieve the identified widget, and insert the widget on an interface display to be rendered on the client device requesting the data. The interface application also communicatively links the widget to the source of the data item (e.g., a data tag or data table register of an industrial controller or other industrial device) so that the widget's display state is updated substantially in real-time based on the current value of the data item. For data items annotated by the metadata as being localizable, the interface application can access a look-up table to determine the appropriate textual representation for the data item. By virtue of being self-described, new device data (e.g., status, operational, and/or diagnostic data) or new services can be added to an industrial device without necessitating a corresponding update in the client-side interface application.

Figure 3:
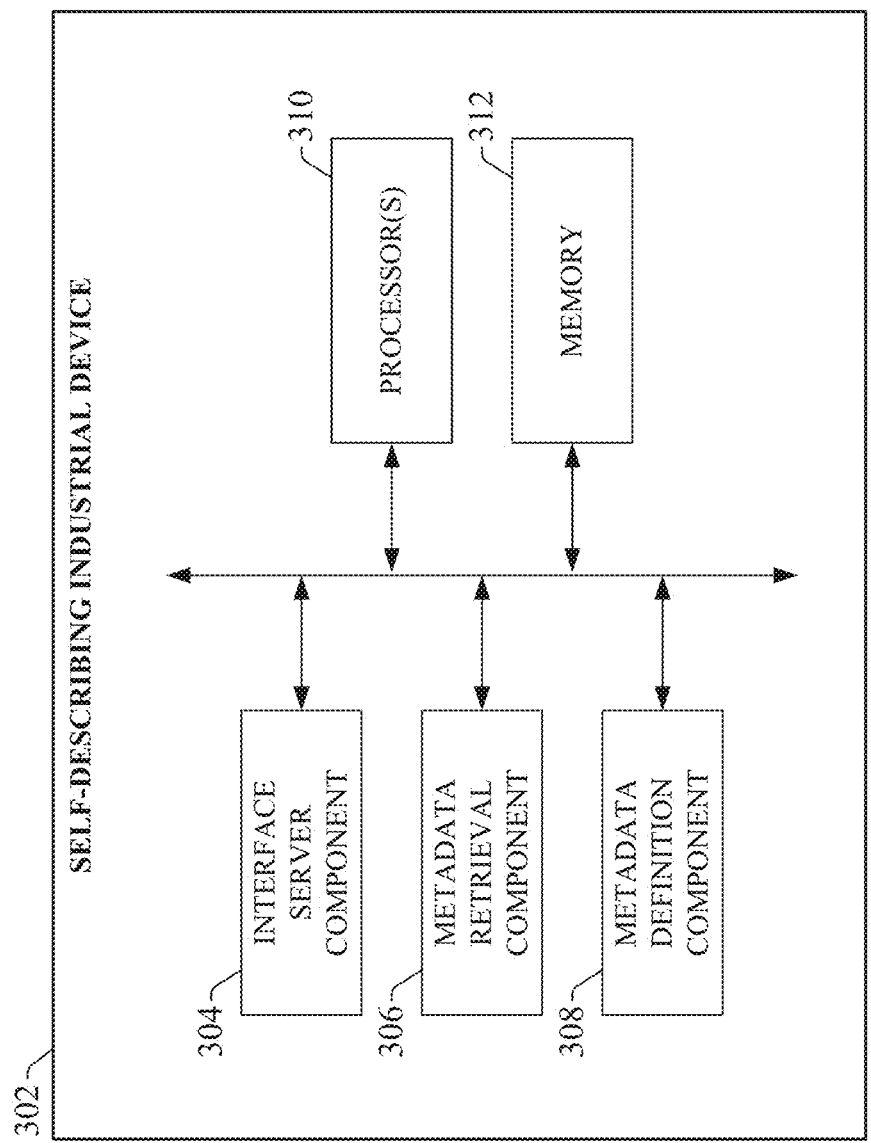
FIG. 3 is a block diagram of an example self-describing industrial device.

FIG. 3 is a block diagram of an example self-describing industrial device 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Self-describing industrial device 302 can include an interface server component 304, a metadata retrieval component 306, a metadata definition component 308, one or more processors 318, and memory 320. In various embodiments, one or more of the interface server component 304, metadata retrieval component 306, metadata definition component 308, the one or more processors 310, and memory 312 can be electrically and/or communicatively coupled to one another to perform one or more of the functions of the self-describing industrial device 302. In some embodiments, components 304, 306, and 308 can comprise software instructions stored on memory 312 and executed by processor(s) 310. Self-describing industrial device 302 may also interact with other hardware and/or software components not depicted in FIG. 3. For example, processor(s) 310 may interact with one or more external user interface devices, such as a keyboard, a mouse, a display monitor, a touchscreen, or other such interface devices.

Interface server component 304 can be configured to generate and serve interface displays to authorized client devices for rendering of device data (e.g., device statistics and diagnostic information, operational values and statuses associated with a process or machine associate with the device, etc.) maintained on the industrial device 302. In some embodiments, the interface server component 304 can be configured to execute an interface application that defines one or more interface displays to be used to render one or more items of the industrial data. The interface server component 304 determines a display format for each item of device data based on presentation metadata that is bound to the device data, and generates the display interfaces in accordance with this metadata.

The metadata retrieval component 306 can be configured to append presentation metadata to an item of device data for processing by the interface server component 304. In one or more embodiments, the metadata retrieval component 306 can determine the appropriate presentation metadata to be added to an item of device data based on pre-defined or dynamically configured data mappings that define how a particular data item or type of data is to be rendered by an interface application. These data mappings can include one or both of vender-defined data mappings or user-defined data mappings. The metadata definition component 308 can be configured to receive mapping definition information from a user (e.g., via a client device such as a laptop, tablet, phone, etc.) defining a presentation format for an item of device data or a type of device data, and to store this mapping definition information for reference by the metadata retrieval component.

The one or more processors 310 can perform one or more of the functions described herein with reference to the systems and/or methods disclosed. Memory 312 can be a computer-readable storage medium storing computer-executable instructions and/or information for performing the functions described herein with reference to the systems and/or methods disclosed.

Figure 4:
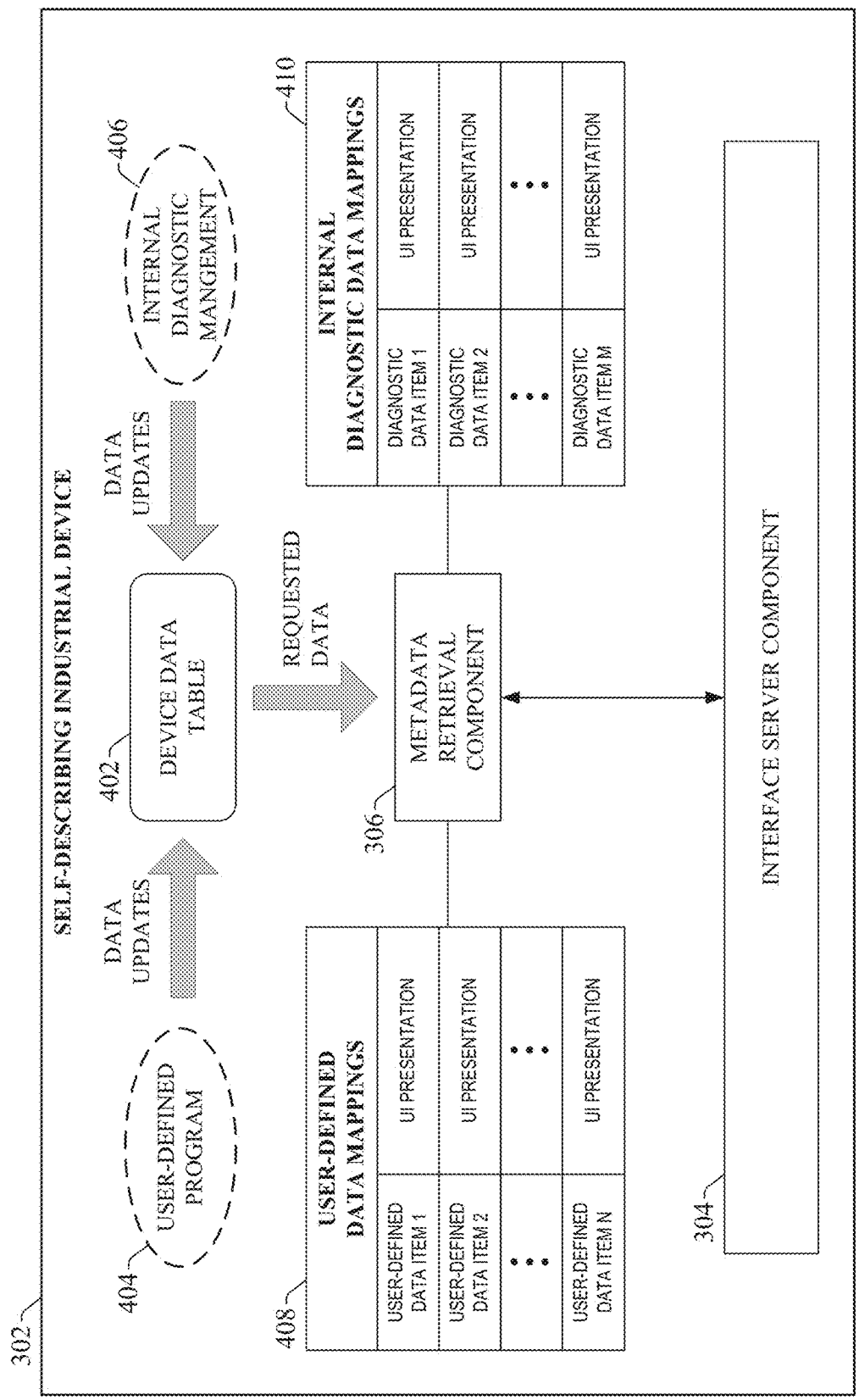
FIG. 4 is a diagram of an example self-describing industrial device including presentation data mapping definitions used to append presentation metadata to requested device data.

FIG. 4 is a diagram of an example self-describing industrial device that includes presentation data mapping definitions used to append presentation metadata to requested device data. Self-describing industrial device 302 can be substantially any type of industrial device or machine, including but not limited to an industrial controller (e.g., a PLC, a soft controller, or other type of industrial controller), a motor drive (e.g., a variable frequency drive or other type of drive), a vision camera or controller, a telemetry device (e.g., a temperature meter, a pressure meter, a flow meter, etc.), an optical presence sensing device, an industrial robot, or other types of industrial devices. A portion of the memory space included in industrial device 302 is dedicated to maintaining a device data table 402, which stores values of user-defined or internal device data. Some data items maintained in the device data table 402 may be static, such as device model and vendor information, device component identifiers, firmware version information, etc. Other data items may convey status information for the device 302 (e.g., an operating mode, an alarm status, a measurement value collected by the device, etc.), and therefore change dynamically depending on the state of device or a measured property. For devices that support execution of user-defined programs, such as industrial controllers, some data items may be user-defined data values whose values are determined by the user-defined program executed by the device 302 (e.g., user-defined program variables).

Internal device diagnostic information relating to the industrial device's internal operation (e.g., processor usage, device fault information, memory usage, disk usage, device power consumption, etc.) is updated in allocated areas of the device data table 402 by internal diagnostic management components 406. For meters or other telemetry devices, measurement components also update the appropriate areas of the data table 402 with measured values obtained by the device's measurement instrumentation (e.g., temperature measurements, flow measurements, pressure measurements, etc.).

Some industrial devices, such as industrial controllers, may also execute a user-defined program 404. In the case of an industrial controller, the user-defined program 404 defines the machine or process control routine to be carried out by the industrial controller via the controller's inputs and outputs. Accordingly, the user-defined program defines and maintains a number of program variables that indicate current states of various aspects of the machine or industrial process being controlled by the industrial controller. When the user-defined program 404 (e.g., a ladder logic program, a sequential function chart, etc.) is executed, the industrial controller allocates memory locations in the device data table 402 for each program variable defined in the user-defined program 404.

To facilitate self-description of available device data for the purposes of visualizing the data on a client-side graphical user interface application, industrial device 302 can include a metadata retrieval component 306 that appends metadata to data items requested by the client-side user interface application. The metadata associated with a given data item informs a user interface application (either residing on the industrial device itself or executing on a client device in communication with the industrial device) how to present the data on a user interface display. In one or more embodiments, the metadata retrieval component 306 appends the metadata to a given item of industrial data in response to receiving a request to view the data item from a user interface application. In various non-limiting examples, the metadata may identify a particular widget, graphical two-state indicator, graphical gauge type, chart type, or a text display format for rendering the requested data item. Upon receipt of the bundled data item and associated metadata, the user interface application can adapt its display screen to render the data item in accordance with the presentation format specified by the metadata. In some embodiments, the metadata may specify a localization look-up identifier that instructs the user interface application to reference the identifier in a local look-up table in order to determine an appropriate text presentation for the data item.

In order to determine the correct user interface (UI) presentation format for a given data item, the industrial device 302 supports configuration of one or more data mappings 408 or 410. In the example depicted in FIG. 4, industrial device 302 includes user-defined data mappings 408, as well as internal diagnostic data mappings 410. Internal diagnostic data mappings 410 may define vendor-specified presentation formats for respective items of device diagnostic data (e.g., internal device faults such as over-power or under-power faults, processor usage statistics, storage memory usage, I/O module statuses, etc.). For each item of internal diagnostic data, the internal diagnostic data mappings 410 define a UI presentation that specifies how that item of diagnostic data is to be rendered on a user interface application. For example, internal diagnostic data mapping may specify that the device's storage memory usage is to be rendered using a gauge graphic or another type of animated graphical object or widget. In some embodiments, the internal diagnostic data mappings 410 may be set by the vendor of industrial device 302 and protected or hidden within the device's storage schema such that an end user cannot modify the presentation formats set for the respective data items. In other embodiments, the device 302 may be provided with the internal diagnostic data mappings 410 made accessible to the end user and configured with write privileges that allow the end user to modify and customize selected items of diagnostic data (e.g., by connecting to the device 302 via a device configuration application, or using a configuration application integrated in the device 302).

Figure 5:
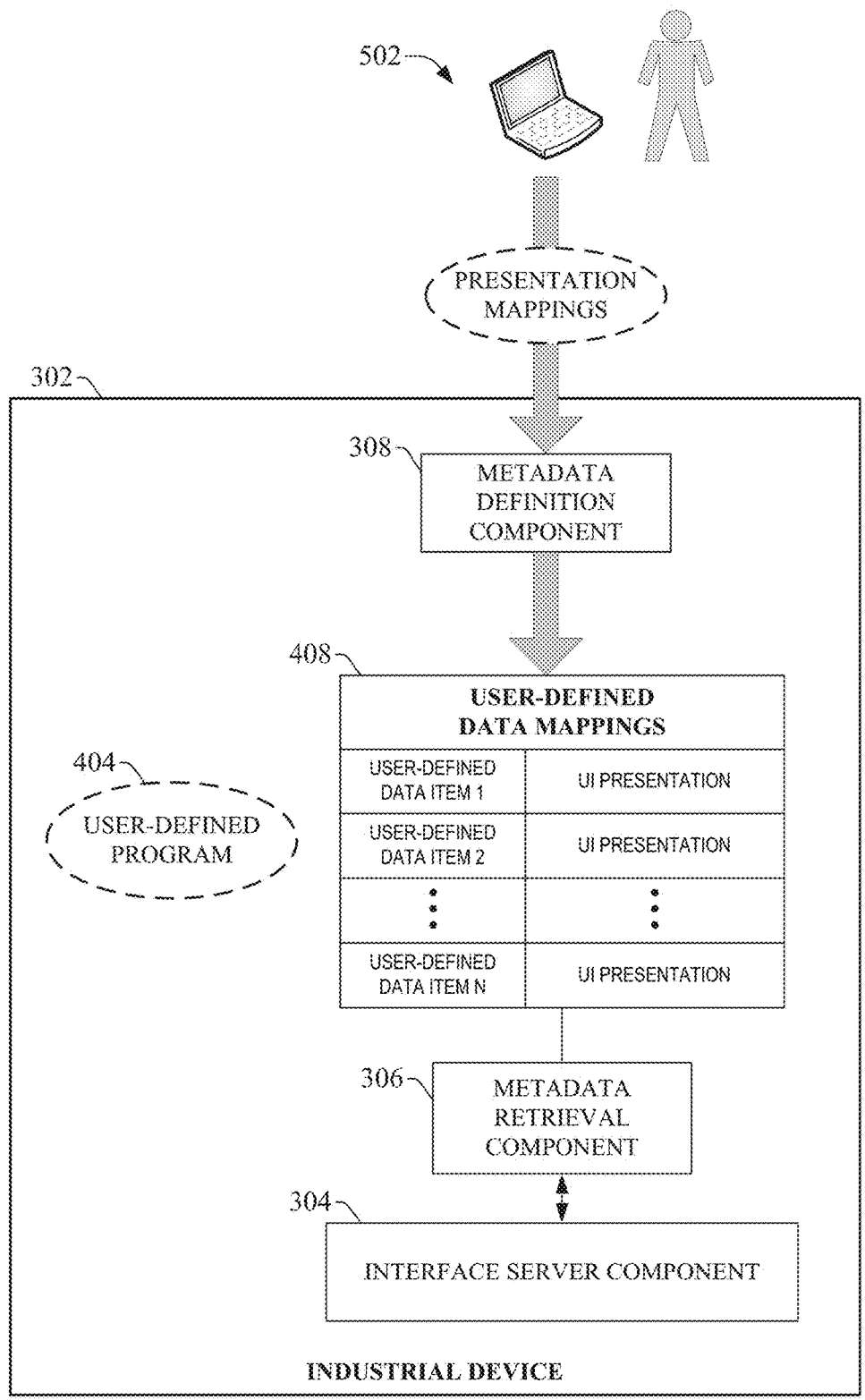
FIG. 5 is a diagram illustrating configuration of user-defined data mappings by a user.

User-defined data mappings 408 are configurable by the end user via the metadata definition component 308. Similar to the internal diagnostic data mappings 410, user-defined data mappings 408 specify a UI presentation for respective user-defined data items. FIG. 5 is a diagram illustrating configuration of user-defined data mappings 408 by a user. In an example scenario in which the industrial device 302 is an industrial controller, the available user-defined data items may be determined based on the user-defined program 404 installed on the device 302 for execution. For example, the available user-defined data mappings may include program variables defined by the developer of user-defined program 404, I/O module configuration information defined by the user-defined program, or other data items associated with user-defined program 404. Metadata definition component 308 can host a configuration interface application that allows the user to generate the user-defined data mappings by setting a desired UI presentation for respective user-defined data items. For example, a user can communicatively connect a client device 502 to the industrial device 302, either over a wireless connection (e.g., a near field communication connection) or using an interface cable (e.g. USB, Ethernet, serial, etc.). Once client device 502 is connected, the metadata definition component 308 can serve a configuration interface to client device 502 that allows the user to select or set a preferred UI presentation for respective items of user-defined data. In an example embodiment, the configuration interface may allow the user to browse data items that are available on the industrial device 302, and to select a data item for which a desired UI presentation is to be set. The configuration interface may then present a list of available display formats (e.g., widgets or graphical objects supported by an interface application) for selection by the user, such that selection of a format from the list maps binds the selected format to the data item. This technique for setting a UI presentation format for a data item is only intended to be exemplary, and other methods for binding a presentation format to a data item are also within the scope of one or more embodiments of this disclosure.

User-defined data mappings 408 and internal diagnostic data mappings 410 are depicted in FIGS. 4 and 5 as defining a UI presentation for individual data items. However, in some embodiments, the data mappings may alternatively or additionally define UI presentations for respective data types, rather than for individual items of data. For example, some data mappings may specify that all Boolean data items are to be displayed on user interface applications using a particular two-state indicator, while all real numeric values are to be displayed using a pie chart. In still other embodiments, the configuration application used to define the data mappings may allow the user define one or more data groups, and to assign multiple data items to each group. A preferred UI presentation can then be set for each data group, where assigning a UI presentation to a group causes the selected UI presentation to be applied to all data items assigned to the group.

These type-based or group-based data mappings can allow the data mappings to be generated more quickly relative to creating an individual mapping for each data item. Moreover, group-based mappings can allow a user to easily segregate data items according to any desired criterion—e.g., production line, product, work area, etc.—and to select UI presentations for the respective groups that may help a viewer to easily identify the group characteristic when the data items are displayed on a user interface application. For example, using the mapping configuration application integrated with industrial device 302 (or executing on a client device communicatively connected to device 302), the user may create two data groups corresponding to respective to production lines, and assign data items associated with the respective production lines to the appropriate group. The user may then define a first UI presentation for the first group and a different second UI presentation to the second group. Thus, data associated with the respective production lines can be visually distinguished when the data items are rendered on a client-side interface application.

In some embodiments, the data mappings may define the UI presentation to be applied to the data item as a function of two or more categories. For example, the data mappings may allow a user to assign a UI presentation to different combinations of data group and data type. In this scenario, the data mapping definitions may accord to the following format:

Group 1, Data Type 1=UI Presentation 1
Group 1, Data Type 2=UI Presentation 2
Group 2, Data Type 1=UI Presentation 3
Group 2, Data Type 2=UI Presentation 4

In this way, UI presentations can be defined for device data items at various levels of granularity to suit the visualization preferences of the user.

Although the example industrial device illustrated in FIG. 4 is depicted as including both internal diagnostic data mappings 410 and user-defined data mappings 408, some embodiments of industrial device 302 may include only one of these two types of data mappings.

Figure 6:
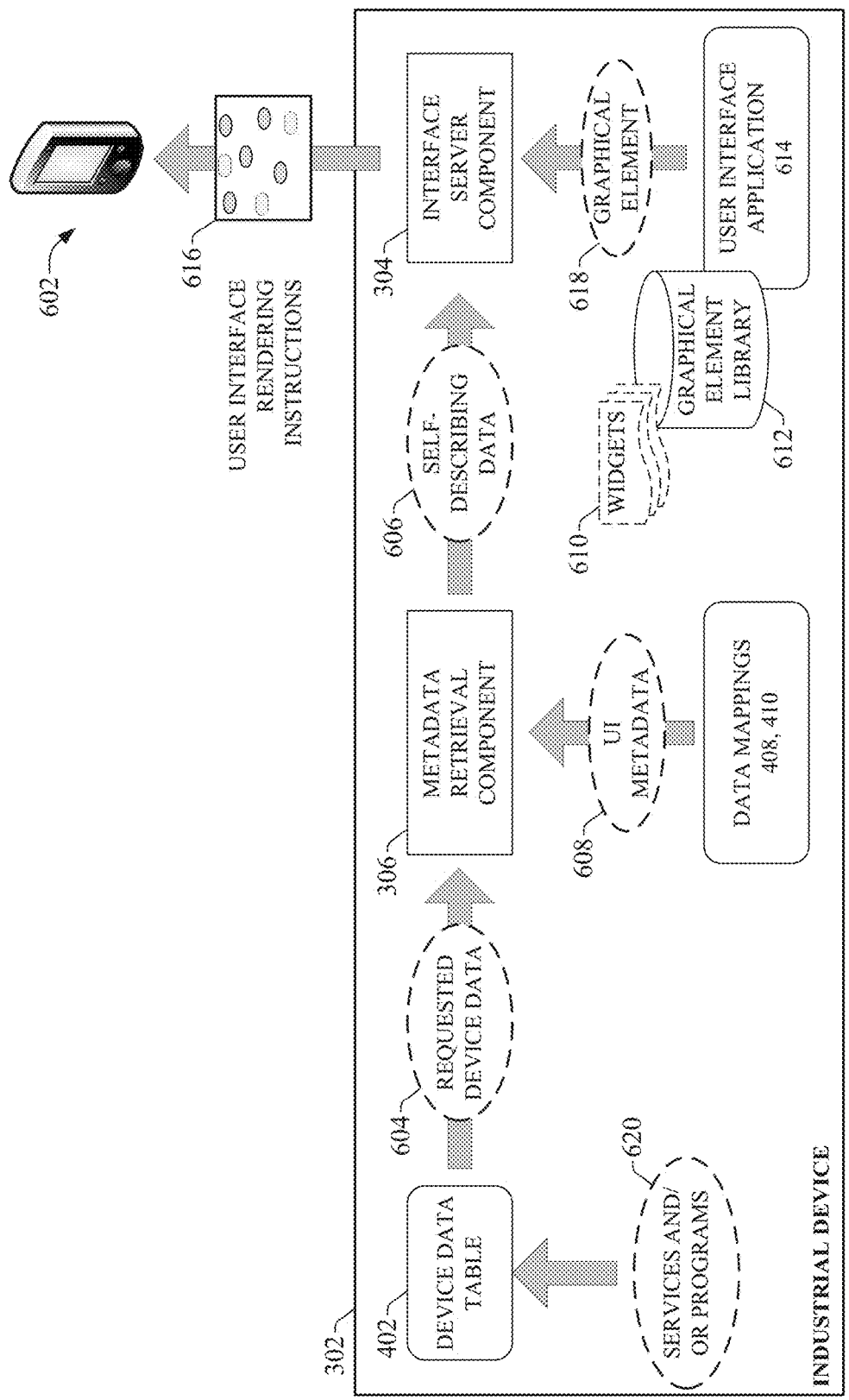
FIG. 6 is a diagram illustrating the use of self-describing data to render industrial device data on a client device.

Once the data mappings have been defined, the industrial device is capable of providing self-describing data to a user interface application. FIG. 6 is a diagram illustrating the use of self-describing data to render industrial device data on a client device. In this example, the user interface application 614 that generates interface displays for viewing data on the industrial device 302 resides on the industrial device 302 itself. In this configuration, industrial device includes an interface server component 304 that delivers user interface rendering instructions 616 to a client device 602 that communicatively connects to the industrial device 302 (over a wireless or cable connection) and requests to view data items available on the device 302. The client device 602 may be, for example, a mobile phone, a wearable computer, a tablet or laptop computer, a desktop computer networked to the industrial device, a human-machine interface terminal, or other such device. The interface server component 304 allows the industrial device 302 to act as a data server that provides requested items of device data to the client device 602. As will be described below, other configurations are also within the scope of one or more embodiments of this disclosure. For example, in some embodiments the user interface application 614 may be installed on the individual client devices rather than on the industrial device itself.

Client device 602 communicatively connects to industrial device 302 (e.g., via a wireless network, a near field connection, a communication cable, etc.) and interfaces with interface server component 304. In one or more embodiments, client device 602 may attempt to communicatively connect to industrial device 302 only in response to an explicit request by the owner of the client device 602 to connect to industrial device 302. Alternatively, client device 602 may be configured with an industrial client application that causes the client device 602 to automatically connect to the industrial device 302 when the client device 602 is in proximity of the industrial device 302 (e.g., when the client device 602 detects a near field communication signal being issued by the industrial device 302).

Once connected, client device 602 sends a request to the industrial device 302 (e.g., via interface server component 304) for at least a subset of available device data stored on the devices data table 402. In some embodiments, the owner of client device 602 may request a selected display screen defined by user interface application 614. The display screen definition may reference a subset of the available data to be rendered on the client device 602, where the subset of data relates to a particular aspect of the industrial device's operation. For example, a first display screen may be configured to display data relating to the industrial device's internal diagnostics, while a second display screen may be configured to display one or more telemetry values measured by the industrial device.

In some embodiments, rather than providing industrial device data to the client device 602 in response to an explicit request from the owner of the client device, the interface server component 304 may be configured to automatically deliver a pre-selected subset of the device data to the client device 602 in response to detecting that the client device is within communication range of the industrial device 302. Using this configuration, a user of client device 602 is dynamically presented with data and statistics for industrial devices in proximity of the user as the user traverses an industrial facility. The subset of data to be sent to the client device 602 in this scenario can be defined by user interface application 614, which can be customized by the end user so that data items considered relevant are presented to the client device 602.

Also, in one or more embodiments, the mobile devices that will be communicating with the industrial device can be configured to operate as part of a mobile device platform that allows the device data to be delivered to mobile devices outside the direct communication range of the industrial device 302 via one or more other mobile devices within the industrial device's communication range. For example, if a first mobile device is outside the communication range of the industrial device, but within a communication range of a second mobile device within the industrial device's communication range, the first mobile device can send a request for one or more items of device data via the second mobile device. In response, the industrial device can send the requested data item and associated presentation metadata to the second mobile device, which then relays this data to the first mobile device. In this way, industrial data and associated presentation metadata can be sent via communication hops to mobile devices outside the immediate communication range of the industrial device.

When a data item from the device data table 402 is to be delivered to the client device 602 (either in response to a request from the client device 602 or pro-actively by the industrial device 302), metadata retrieval component 306 retrieves the requested device data 604 from the data table 402 and references the data mappings 408 and/or 410 to determine how the data item is to be presented on the user interface. As noted above, the UI presentation to be applied to the selected data item may be defined in the data mappings as a function of the specific data item, as a function of the data item's type (e.g., Boolean, real value, integer value, etc.), or as a function of a user-defined data group to which the data item has been assigned. The metadata retrieval component 306 then appends the UI presentation metadata 608 defined for the requested data item to the retrieved data item to yield a self-describing data packet.

Figure 7:
FIG. 7 is a representation of an example self-describing data packet.

An example self-describing data packet is illustrated in FIG. 7. In this example, self-describing data packet 702 includes a Data Item Identifier field that uniquely identifies the data item (e.g., a device tag name assigned to the data item, a data register identifier corresponding to the register in which the data item originates, etc.), a Data Value field containing the current value of the data item, and a Data Type field identifying the type of the requested data item (e.g., Boolean, numeric, time-series, etc.). In addition, the metadata retrieval component 306 adds a UI presentation identifier to a Presentation Metadata field. This UI presentation identifier corresponds to the UI presentation format defined for the data item by the data mappings associated with the industrial device. The UI presentation identifier identifies a particular widget or other graphical object to be used to render the data value contained in the data value field. For mappings that are defined at the data item level, the metadata retrieval component 306 retrieves and appends the UI presentation identifier corresponding to the data item identifier as defined by the data mappings (as indicated by the arrow in FIG. 7 conveying the link between the data item identifier and the presentation metadata). For mappings that are defined according to data type, the metadata retrieval component 306 will retrieved and append the UI presentation identifier corresponding to the data type specified in the Data Type field. For group-level mappings, self-describing data packet 702 may also include a Group field identifying the user-defined data group to which the data item belongs, and the metadata retrieval component 306 will retrieved and append the UI presentation identifier corresponding to the group identifier (optionally in combination with the data type and/or the data item identifier).

FIG. 7 lists a number of example UI presentation identifiers that may be specified by Presentation Metadata field. For example, a particular Boolean data item may be associated with a two-state indicator (e.g., a two-color LED graphic) that renders the Boolean value indicated in the Data Value field using a two-state color animation. For numeric data items associated with upper and lower limits, the Presentation Metadata field may specify a radial or linear gauge widget as the means for rendering the numeric value contained in the Data Value field. To display numeric array data or time-series, a pie chart, bar graph, or trend chart widget may be selected as the UI presentation. Users may also prefer that some data items be displays as alphanumeric text. Accordingly, the user can configure the data mappings to specify that such data items are to be presented as text when rendered on a client-side user interface.

The Presentation Metadata may also indicate a look-up value corresponding to an entry of a localization table that defines how the data item is to be rendered, thereby facilitating localization of data items. For example, a particular device status value may have an integer value range between 0 and 3, where each integer value corresponds to a state of a particular device parameter. The display graphic or text to be used to convey the respective states may be defined in a localization table associated with the user interface application 614. For example, as defined in the localization table, a localized data item may use the value 0 to represent a "good" status, while the value 3 represents a "faulted" status. The Presentation Metadata field for this data item may indicate that the UI presentation is to be determined by referencing the localization table associated with user interface application 614, and the Data Value field indicates the value to be cross-referenced in the localization table in order to determine the text or graphical object to be used to convey the state represented by the value.

Returning to FIG. 6, the self-describing data packet 606 is provided to interface server component 304, which is configured to generate rendering instructions for the client device 602 based on the self-describing data and the graphics supported by user interface application 614. For example, the user interface application 614 may have an associated graphical element library 612 containing a number of widgets 610 or other graphical objects supported by the user interface application 614. The Presentation Metadata field of the self-describing data packet identifies which of the supported widgets 610 is to be used to render the data item contained in the self-describing data packet. Accordingly, in response to receipt of the self-describing data packet 606, the interface server component 304 retrieves the graphical element 618 corresponding to the presentation metadata contained in the Presentation Metadata field and sends rendering instructions to the client device 602 that cause the client device to render the data item value using the retrieved graphical element. For data items that are to be localized, the interface server component 304 references the localization table associated with the user interface application 614 to determine the appropriate user interface format for the data item.

If the retrieved data item is requested by client device 602 by invoking a pre-configured display screen that references the data item, the interface server component 304 will insert the identified graphical element (e.g., widget or other graphical element) on the display screen at a location defined by the screen definition file, or at a location dynamically selected based on the available screen space and display properties of the client device 602 on which the screen will be rendered (e.g., the display size and ratio supported by the client device, the orientation of the client device, etc.). In some embodiments, the rendering instructions generated by the interface server component 304 may be configured to leverage native graphical rendering capabilities of the client device 602 (e.g., Javascript, scalable vector graphics, etc.) in order to display the requested data item in the format defined by the UI presentation metadata.

Figure 8:
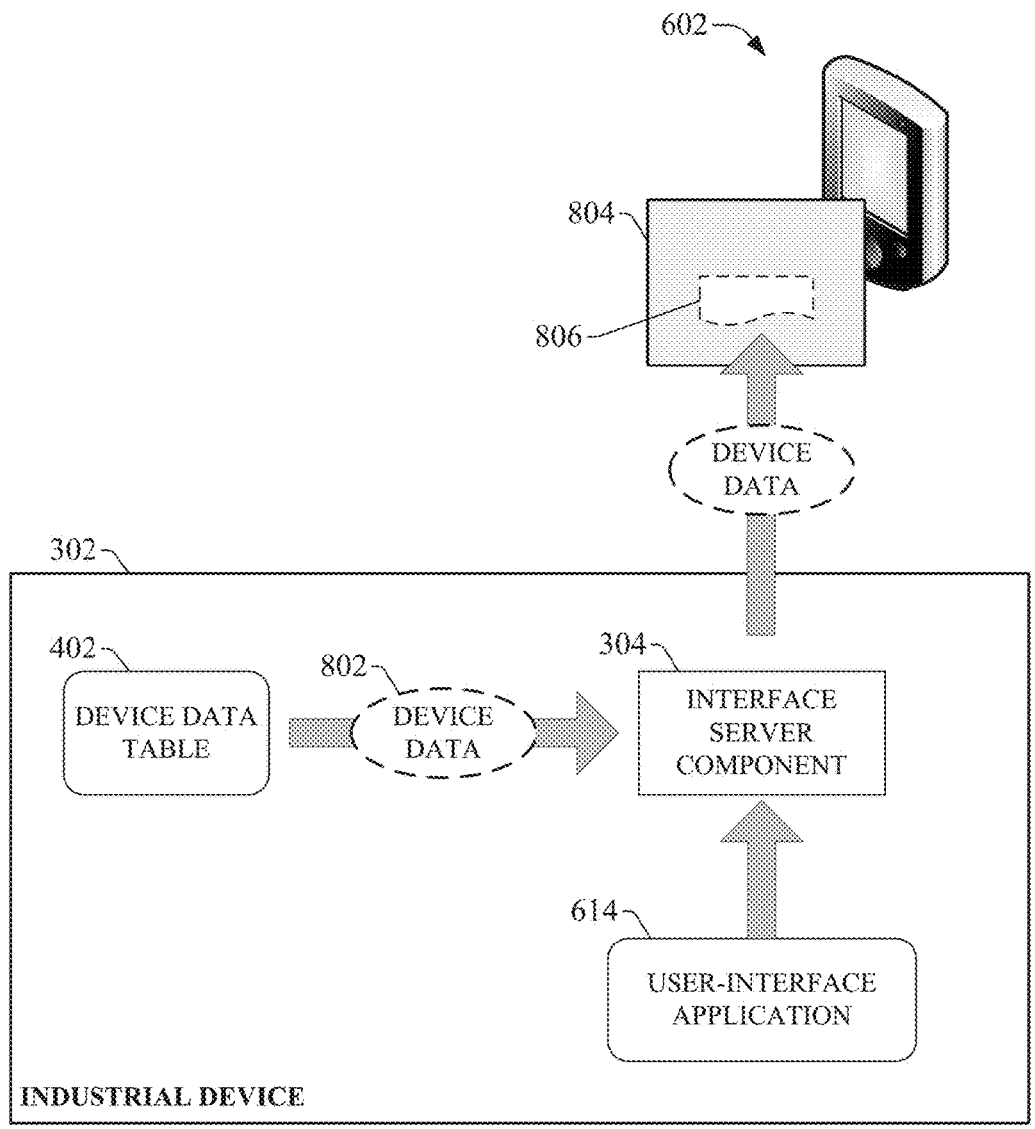
FIG. 8 is a diagram illustrating delivery of live device data to client device via a graphical object selected in accordance with user interface presentation metadata.

Once the user interface including the requested data item has been rendered by the client device 602 in accordance with the rendering instructions provided by the interface server component 304, the interface server component 304 can dynamically update the presentation of the data item in accordance with the value of the data item in the device data table 402. FIG. 8 illustrates delivery of live device data to client device 602 via the graphical object selected in accordance with the UI presentation metadata. In this example, a display screen 804 for viewing device data generated by industrial device 302 has been rendered on client device 602, and includes a graphical object (e.g., a widget) 806 for rendering a particular item of device data available in data table 402. The graphical object 806 was selected by the interface server component 304 based on the UI presentation metadata associated with the data item.

Once the graphical object 806 has been rendered, the interface server component 802 continues to update the display state of the graphical object (e.g., gauge position, indicator color, alphanumeric text, etc.) to reflect the current value of the data item as read from the device data table 402. The data updates will continue until the client device 602 is moved outside the communication range of industrial device 302, or until the user closes the display screen 804. In various embodiments, updates to the data item's value can be sent by the interface server component 304 either continuously, periodically, or in accordance with one or more defined update rules. In the case of periodic or rule-based updates, the interface server component 304 can allow the user to define one or more rules that define how or when updates to the data item's value are to be sent to the client device. These rules can define, for example an update rate for periodic updates, conditions that will trigger a transmission of an updated data packet (e.g., a data item setpoint that, when satisfied by the current value of the data item, will trigger a transmission of a new data packet), or other such update rules. In one or more embodiments, these update rules can be defined on a per-client bases, allowing respective client devices to define their own update rules that dictate how often or under what conditions updated data packets will be sent. These client-specific rules can be maintained by the interface server component 304, which uses these rules to determine how often to send data updates to respective different client devices.

In some embodiments, the widget or graphical object used to display a particular item of data can be dynamically re-selected based on a value of the data item in the data table. In such embodiments, the mapping information for a given data item may define multiple different widgets or graphical objects—rather than a single widget or graphical object—as well as a data range or value associated with each widget or graphical object. When a data item is to be rendered on the client-side interface application, the system will select the widget to be used to render the data item based on the identification of the data item as well as the current value of the data item within the device's data table. Metadata identifying this widget will be appended to the data item for delivery to the client-side interface application, as described in previous examples. Once the widget has been rendered on the client-side interface, the state of the widget (e.g., color, fill level, gauge position, etc.) will be continually or periodically updated in accordance with the value of the data item, as also described previously. In this example, if the value of the data item changes to a value within a defined range corresponding to a different widget or graphical object (as defined by the mapping information), the system will append to the data item identifier a different item of presentation metadata identifying the new widget or graphical object, causing the client-side interface to replace the previously selected widget with the newly selected widget corresponding to the new data range.

Figure 9:
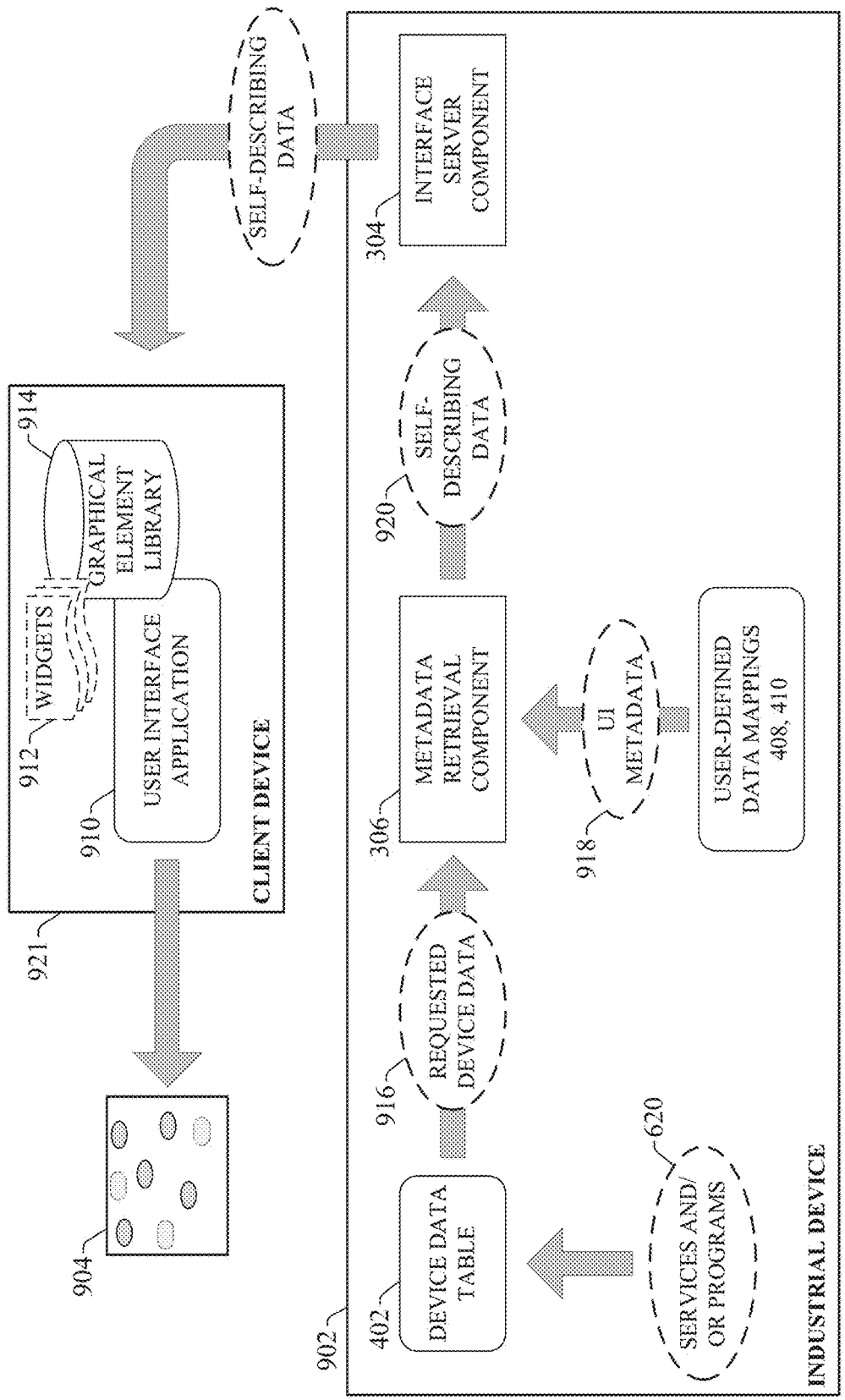
FIG. 9 is a diagram illustrating a configuration in which self-describing data generated by an industrial device is delivered to a client device executing a user interface application.

Although the example depicted in FIG. 6 depicts the user interface application as residing on the industrial device 302 itself, in some embodiments the user interface application may instead be installed on the client devices that will be accessing the industrial device data. FIG. 9 is a diagram illustrating a configuration in which self-describing data generated by the industrial device is delivered to a client device executing a user interface application. Similar to the configuration depicted in FIG. 6, industrial device 902 maintains a data table 402 that stores and updates device data associated with the device, a metadata retrieval component 306 for appending UI presentation metadata to requested data items, and an interface server component 304 that that interacts with a client device 921 to present selected items of device data on the client device 921. In this example, a user interface application 910—as well as its associated graphical element library 914—has been installed on client device 921. User interface application 910 may be, for example, a human-machine interface application, an industrial control program viewing and/or development application, a custom visualization application for rendering data form the industrial device, a web browser, or other such interface application.

A user of client device 921 may interact with user interface application 910 to request one or more data items from industrial device 902. For example, the user may invoke a display screen defined in user interface application 910 that references one or more data items available in industrial device 902. In response to invoking the display screen, the user interface application 910 sends a request to interface server component 304 for the data items to be rendered on the display screen. The metadata retrieval component 306 responds to this request by retrieving the requested device data 916, associating the appropriate UI presentation metadata 918 with the respective data items to yield self-self-describing data 920, and providing the self-describing data to the interface server component 304 for delivery to the client device.

The user interface application 910 installed on client device 921 is configured to adapt presentation of the data items on the display screen 904 in accordance with the UI presentation metadata associated with each data item. Accordingly, for each data item, the user interface application 910 selects a graphical object from the set of widgets 912 corresponding to the UI presentation metadata defined in the self-describing data packet for the data item. The user interface application 910 positions the selected graphical object at a preassigned location on the display screen 904, or dynamically selects a suitable location for the graphical object based on the available display screen space and the client device's display capabilities. For example, the user interface application 910 may orient the graphical objects on the display screen 904 based on an arrangement determined to conform to the size and ratio of the client device's display screen.

In the case of data items that are to be localized, the user interface application 910 may maintain one or more localization tables used to determine a suitable presentation format for localized data items based on information in the self-describing data packet. For example, the Presentation Metadata field of the self-describing data packet may indicate that the associated data item is to be localized. In embodiments in which more than one localization table is maintained by the user interface application 910, the self-describing metadata may also identify the particular localization table to be used to determine the presentation format. The user interface application 910 reads the data value (typically an integer value) from the Data Value field of the self-describing data packet, and cross-references this data value in the localization table to determine the appropriate presentation format for the data item.

Figure 10:
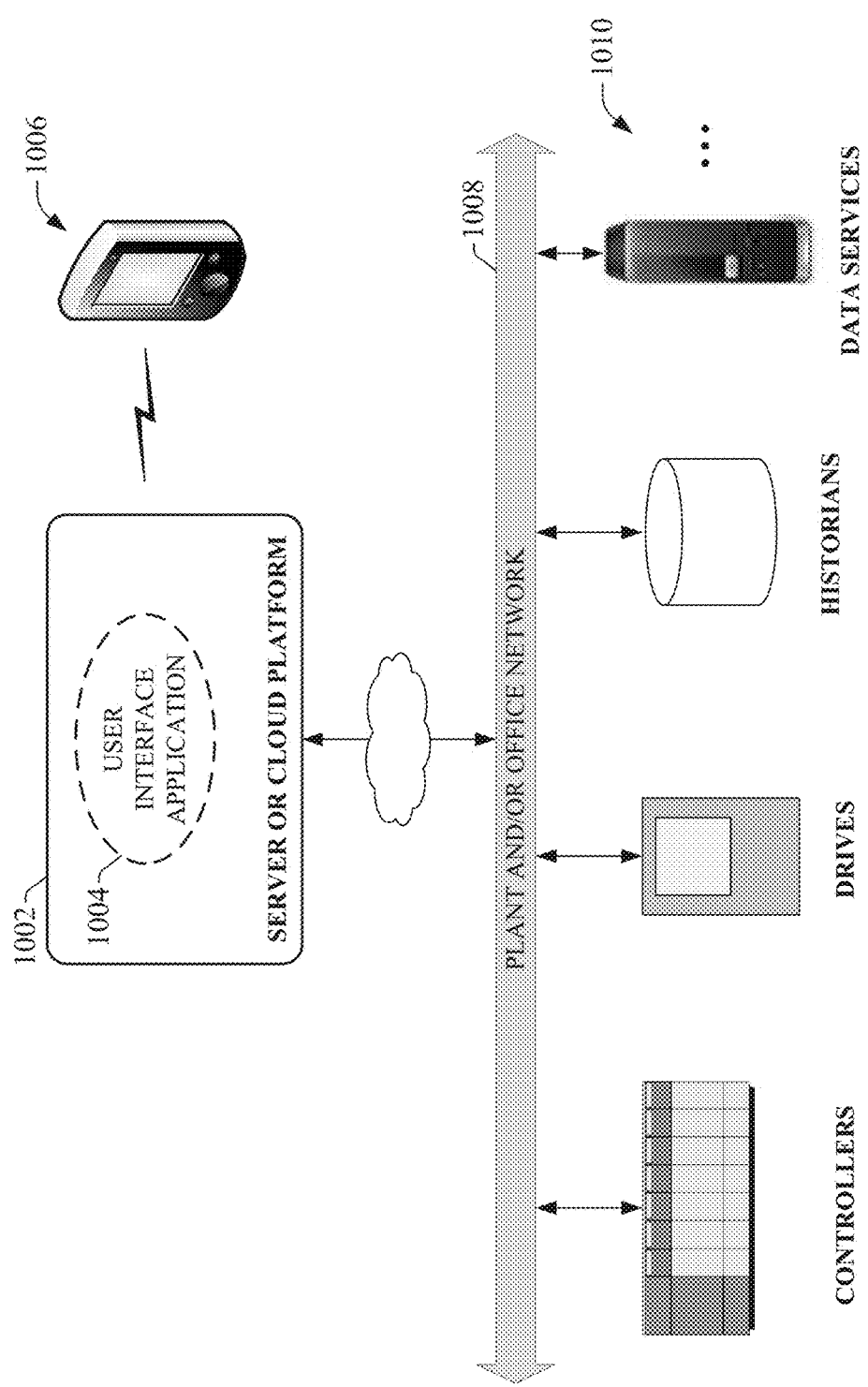
FIG. 10 is a diagram illustrating an architecture in which a user interface application resides on a server or cloud platform that is communicatively connected to industrial devices within a plant environment.

The preceding examples describe scenarios in which the user interface application resides on either the industrial device or on the client device on which the data is viewed. However, the self-describing industrial data described herein can also be used within an architecture in which the user interface application resides at a central location, such as a server or cloud platform, separate from the industrial device and client devices. FIG. 10 is a diagram illustrating an architecture in which a user interface application 1104 resides on a server or cloud platform 1002 that is communicatively connected to industrial devices 1010 within a plant environment via a plant and/or office network 1008. The industrial devices may include, for example, industrial controllers, drives, field devices such as meters or other telemetry devices, or other such industrial devices. Device 1010 may also include data historians that collect and archive selected data sets from one or more industrial systems (e.g., operational history data, maintenance history data, production statistics, trend data, etc.). Devices 1010 may also include other types of data services, such as enterprise resource planning systems or manufacturing execution systems.

In the scenario in which the user interface application 1004 resides on a networked server, the server may reside in the plant facility and be networked to the industrial devices 1010 via plant and/or office network 1008. Client devices 1006 (e.g., networked desktop computers, mobile phones or tablet computers that wirelessly connect to the server, wearable computers, etc.) can connect to the server and access the user interface application 1004 in order to view selected sets of industrial data available on the industrial devices 1010. For example, user interface application 1004 may include one or more predefined interface display screens that reference one or more items of industrial data available on industrial devices 1010. When a client device 1006 accesses the server and invokes a display screen (or otherwise requests a presentation of industrial data available on one or more of the industrial devices 1010), the user interface application 1004 sends a request for the relevant data items. In response, the industrial devices 1010 send self-describing data packets (generated as described above) to the user interface application 1004 via the network 1008. The user interface application 1004 sends instructions to the client device 1006 for generating a presentation of the requested data in accordance with the UI presentation metadata included in the data packets.

For cloud-based implementations, the user interface application 1004 operates in substantially the same manner, but resides and executes on a cloud platform accessible by authorized client devices 1006. In this cloud-based architecture, the industrial devices 1010 may be configured to communicatively interface with the cloud platform via integrated cloud interfaces, or through a separate cloud gateway device that securely manages data traffic between the industrial devices 1010 and the cloud platform. In this way, requested data items can be passed from the industrial devices 1010 to the cloud platform for delivery to authorized client devices 1006. The client device 1006 can wireless access the cloud platform and interact with user interface application 1004, which can deliver visualization instructions to the client device 1006 for generating a graphical presentation of the industrial data, as described above.

Figure 11B:
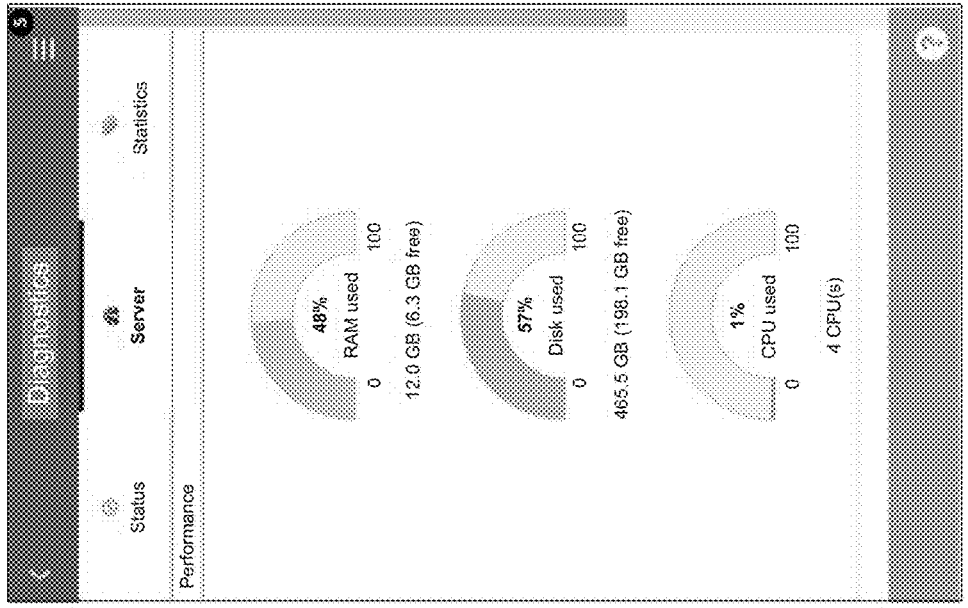
FIGS. 11A-11C are example, non-limiting display screens that render widget for displaying items of industrial data in accordance with self-describing data techniques.
Figure 11A:
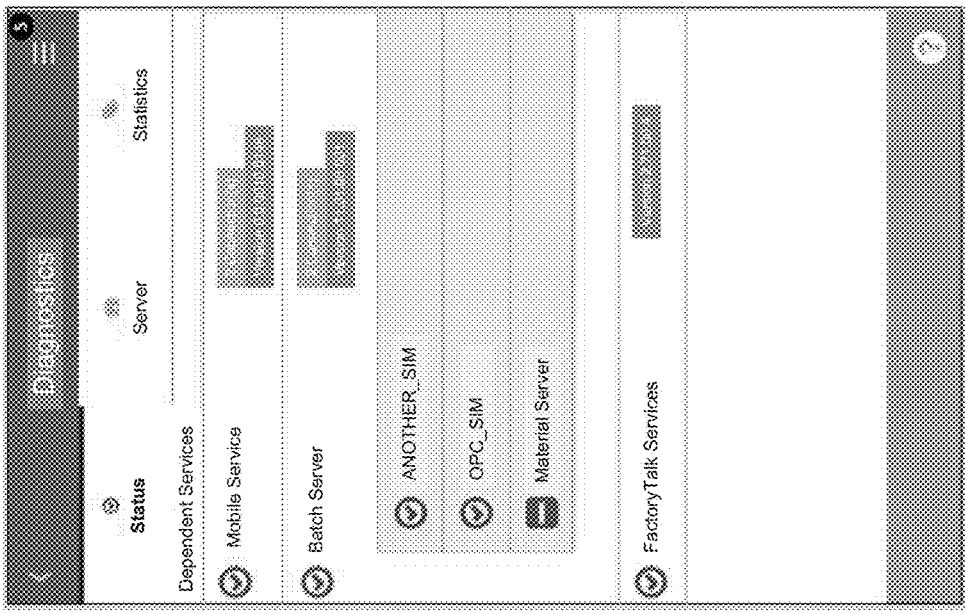

FIGS. 11A-11B are screen shots of example, non-limiting display screens that render widgets for displaying items of industrial data in accordance with the self-describing data techniques described above. FIG. 11A is an example status screen that renders version information for various services running on an industrial device, as well as connection statistics for the respective services. The version and connection statistics are rendered as alphanumeric text in accordance with the self-describing data packets for these values. In addition, check mark graphics located next to each service indicate statuses for the respective services. FIG. 11B is an example server screen that displays random access memory (RAM) usage, disk usage, and processor usage for an industrial device. In this example, the usage values are maintained in the industrial devices as limited numeric values between 0 and 100 (representing percentages). The data mappings defined for the industrial device indicate that these usage values are to be represented as graphical gauges, as shown in FIG. 11B. Accordingly, when these usage values are requested by the client device, the industrial device generates self-describing data identifying the gauge widgets to be used by the user interface application to render these values. Upon receipt of the self-describing data packets for the usage values, the user interface application reads the UI presentation metadata associated with the respective usage values and renders the usage percentages using the identified gauge widgets.

Figure 11C:
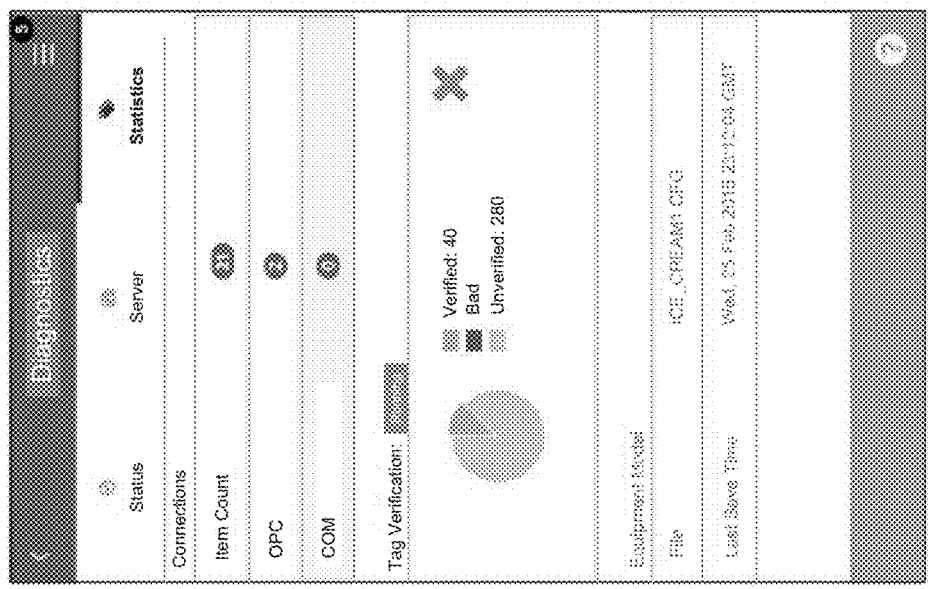

FIG. 11C is an example statistics screen that displays a number of statistics as alphanumeric text. In addition, a pie chart is used to convey the numbers of verified, unverified, and bad tags associated with the industrial device. Selection of the pie chart widget to display the tag verification statistics is dictated by the UI presentation metadata received with the tag verification values.

The techniques described herein for configuring and providing self-describing industrial and diagnostic data reduces the traditionally close coupling between data services running on industrial devices and the client software that visualizes data generated by these services, affording end users a greater degree of flexibility with regard to version coordination between client software and industrial device services (e.g. firmware versions, operating system versions, etc.). For example, the self-describing nature of the device data allows new data values or services (e.g., service 620 of FIG. 6) to be added to industrial devices without requiring the client-side visualization application (e.g., user interface application 614) to be updated in order to correctly render the new data, since the new values are provided with associated presentation metadata that instructs the client-side application how the new values should be displayed. This can be particularly useful when a client interface application is installed on a mobile device carried by a user as the user traverses a plant environment, since the user may encounter different industrial devices running different versions of their respective services. Since the user interface is configured to adapt in accordance with the UI presentation metadata associated with retrieved data items, the user can view data provided by disparate versions of data services running on different industrial devices using the same version of the user interface application. Since the user interface application is configured to determine a suitable presentation format for data based on the UI presentation metadata provided with the data, the user interface application only needs to be updated to install new user interface widgets or graphical objects as they become available.

Figure 12:
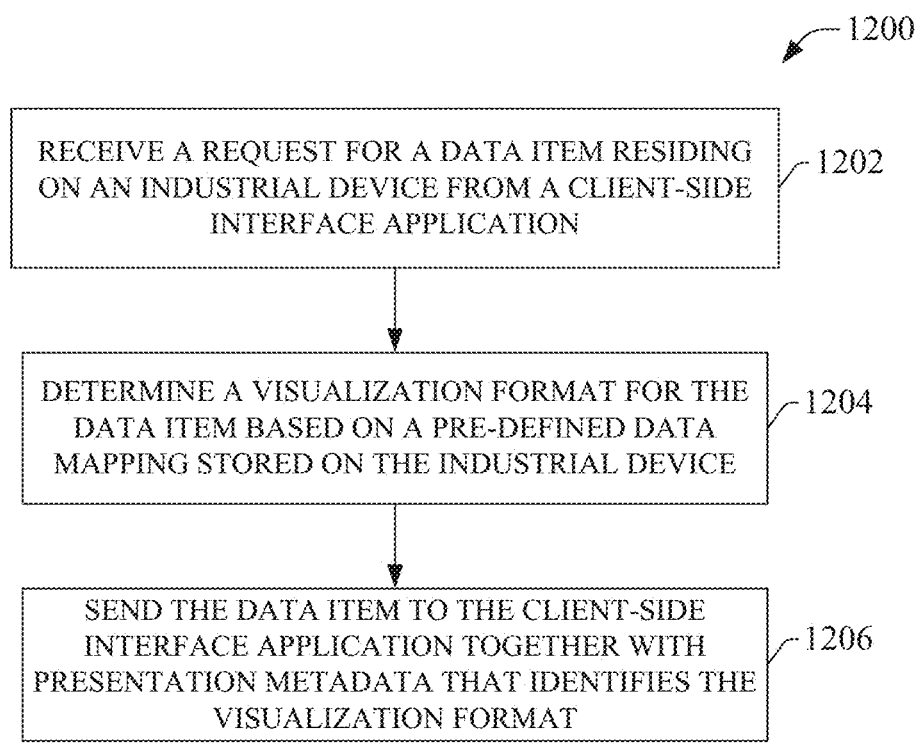
FIG. 12 is a flowchart of an example methodology for providing self-describing industrial data to a client-side user interface application.
Figure 13:
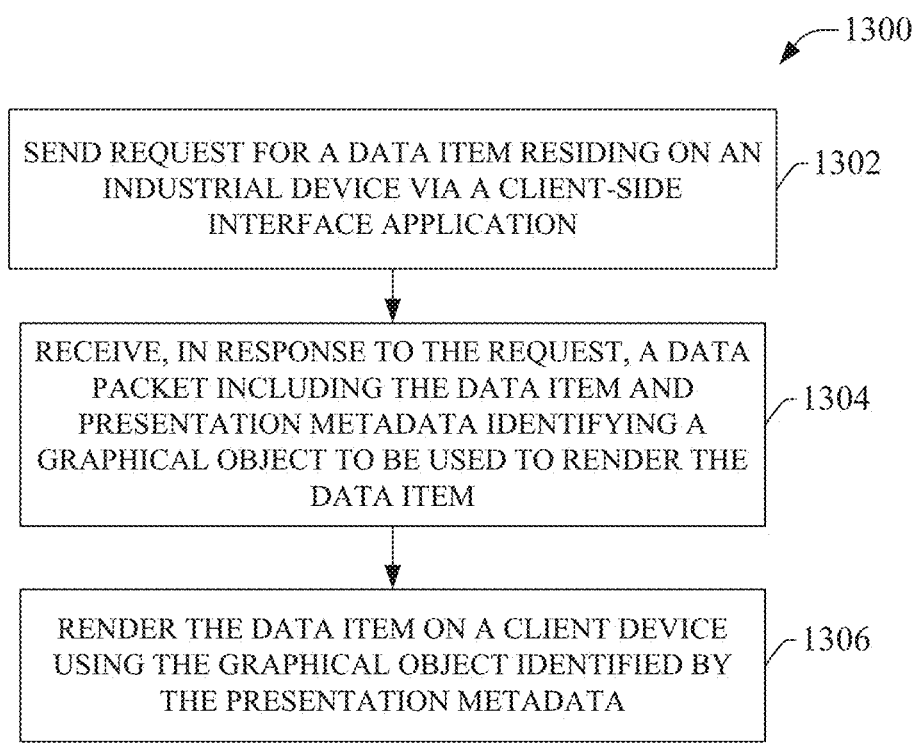
FIG. 13 is a flowchart of an example methodology for retrieving and visualizing industrial data by a client-side graphical interface application.

FIGS. 12-13 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 12 is an example methodology 1200 for providing self-describing industrial data to a client-side user interface application. Initially, at 1202, a request for a data item residing on an industrial device is received from a client-side interface application. The industrial device may be, but is not limited to, an industrial controller, a motor drive, a telemetry device, a vision camera or vision controller, an optical presence sensing device, or other such industrial device. The request for the data item can be received from a client device in communication with the industrial device, including but not limited to a mobile phone, a tablet or laptop computer, a wearable computer, a desktop computer, or other such client device. In various example scenarios, the interface application may execute on the client device itself, on the industrial device, or on a cloud platform accessible by the client device and in communication with the industrial device. Other configurations are also within the scope of one or more embodiments of this disclosure.

At 1204, a visualization format for the data item is determined based on a pre-defined data mapping stored on the industrial device. For example, a metadata retrieval component on the industrial controller can access the pre-defined data mapping and retrieve presentation metadata associated with the requested data item, where the presentation metadata identifies a widget or other graphical object that is to be used by the interface application to render the data item on the client device.

At 1206, the data item is sent to the client-side interface application together with the presentation metadata that identifies the visualization format. The presentation metadata is translatable by the client-side interface application to render the data value in accordance with the visualization format identified by the presentation metadata.

FIG. 13 is an example methodology 1300 for retrieving and visualizing industrial data by a client-side graphical interface application. Initially, at 1302, a request for a data item residing on an industrial device is sent via a client-side interface application. At 1302, in response to the request, a data packet is received, where the data packet includes the requested data item and presentation metadata identifying a graphical object to be used to render the data item. At 1306, the data item is rendered on a client device using the graphical object identified by the presentation metadata. For example, the interface application may retrieve the identified graphical object from a library of supported graphical objects associated with the interface application, and insert the graphical object onto a user interface display generated by the interface application. The visual state of the graphical object is then set based on the value of the data item included in the data packet.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 14:
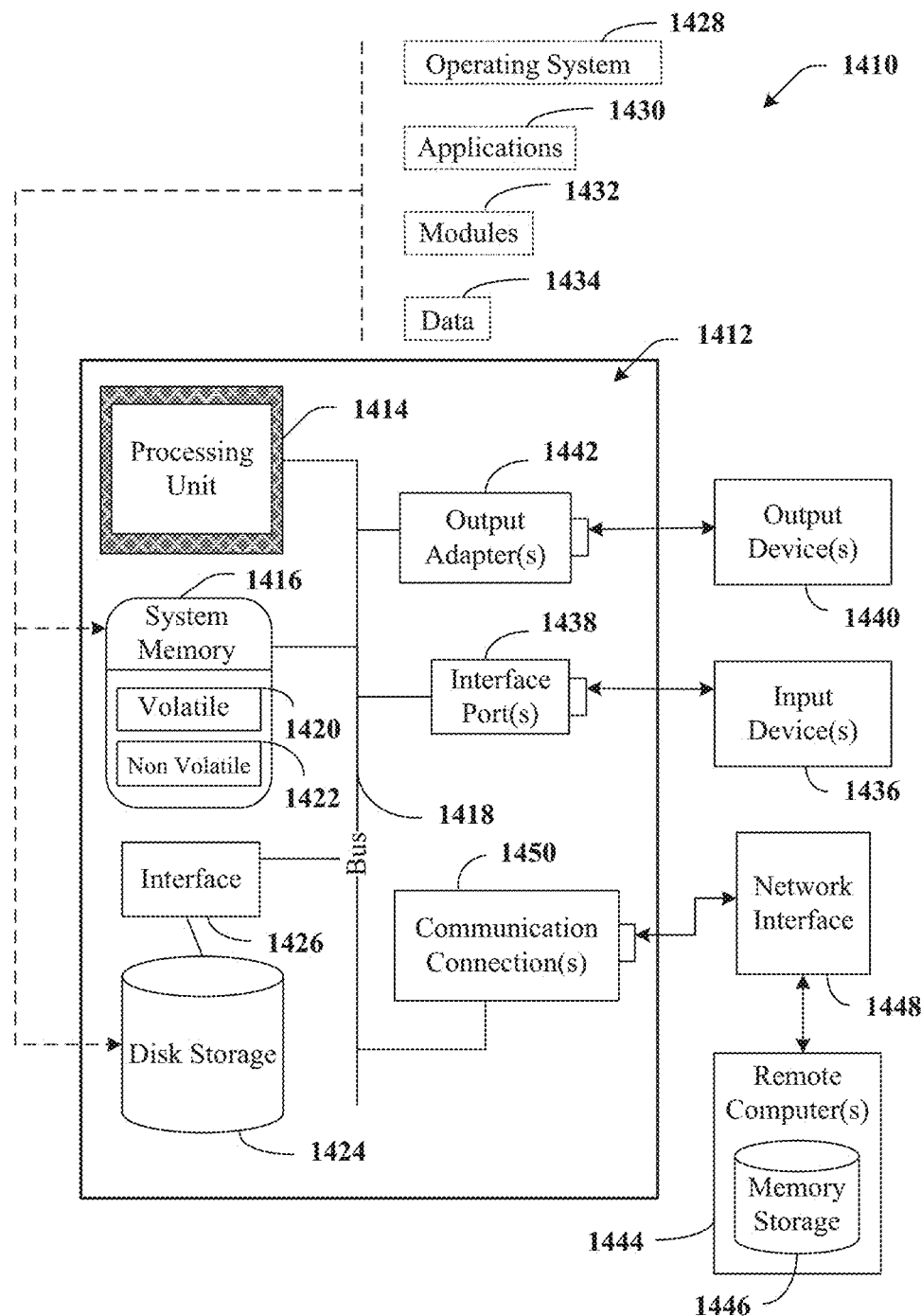
FIG. 14 is an example computing environment.
Figure 15:
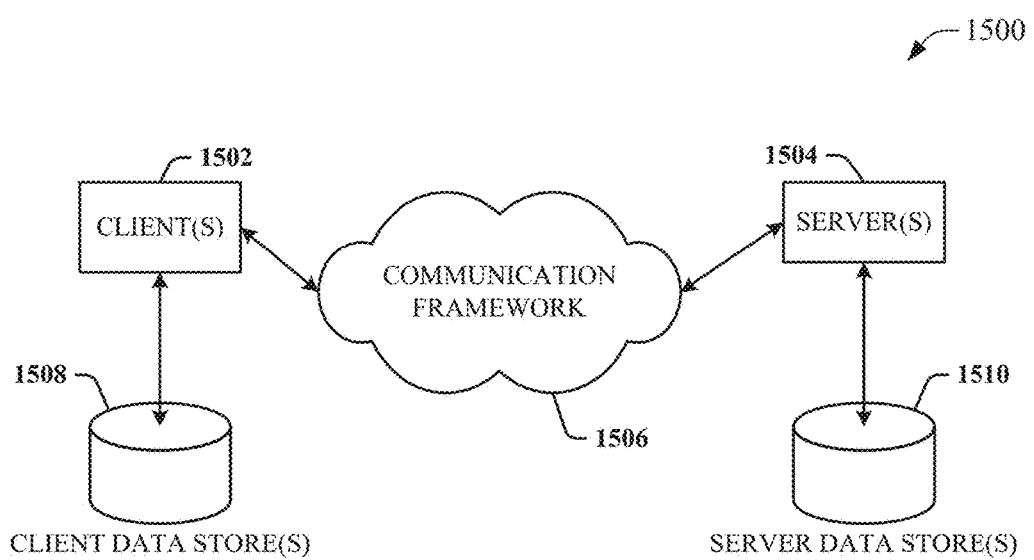
FIG. 15 is an example networking environment.

In order to provide a context for the various aspects of the disclosed subject matter, FIGS. 14 and 15 as well as the following discussion are intended to provide a brief, general description of a suitable environment in which the various aspects of the disclosed subject matter may be implemented.

With reference to FIG. 14, an example environment 1410 for implementing various aspects of the aforementioned subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Multi-core microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable PROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer 1412. System applications 1430 take advantage of the management of resources by operating system 1428 through program modules 1432 and program data 1434 stored either in system memory 1416 or on disk storage 1424. It is to be appreciated that one or more embodiments of the subject disclosure can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapters 1442 are provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1946 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1448 can also encompass near field communication (NFC) or Bluetooth communication.

Communication connection(s) 1450 refers to the hardware/software employed to connect the network interface 1448 to the system bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample computing environment 1500 with which the disclosed subject matter can interact. The sample computing environment 1500 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and servers 1504 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An industrial device, comprising:
a memory that stores executable components;
a processor, operatively coupled to the memory, that executes the executable components, the executable components comprising:
 a metadata retrieval component configured to, in response to a request received from a client device for a data item stored on the memory, send the data item and presentation metadata to the client device, wherein
 the memory stores data mapping information that defines graphical formats associated with respective data items including the data item,
 the presentation metadata specifies a graphical format to be used to render the data item on the client device,
 the metadata retrieval component selects the presentation metadata based on the data mapping information, and
 the industrial device is at least one of an industrial controller, a motor drive, a meter, a telemetry device, a vision controller, an industrial robot controller, or an optical sensor.

2. The industrial device of claim 1, further comprising a metadata definition component configured to generate the data mapping information in accordance with user input data defining a presentation format for at least one of the data items.

3. The industrial device of claim 2, wherein the metadata definition component is further configured to generate, on the client device or another client device, a configuration interface that receives the user input data via interaction with the configuration interface.

4. The industrial device of claim 3, wherein the configuration interface is configured to
render the data items,
receive, as a first portion of the user input data via interaction with the configuration interface, data item selection input identifying one of the data items,
render indications of available display formats for the one of the data items, and
receive, as a second portion of the user input data via interaction with the configuration interface, format selection input identifying one of the available display formats to be association with the one of the data items.

5. The industrial device of claim 1, wherein
at least a portion of the data mapping information defines an association between a data type and one of the graphical formats, and
the metadata retrieval component selects the presentation metadata based on the association and a determination that the data item corresponds to the data type.

6. The industrial device of claim 1, wherein at least a portion of the data mapping information defines a group comprising a subset of the data items, and defines an association between at least one of the graphical formats and the group.

7. The industrial device of claim 1, wherein the data mapping information defines, for the data item, different graphical formats corresponding to respective different ranges of values of the data item.

8. The industrial device of claim 1, wherein the presentation metadata identifies at least one of a graphical widget, a two-state indicator, or a pie-chart to be used to render the data item on the client device.

9. The industrial device of claim 1, wherein the presentation metadata comprises look-up key data that corresponds to an entry of a localization table that identifies a text representation for the data item.

10. The industrial device of claim 1, further comprising an interface server component configured to send the data item and the presentation metadata to the client device in response to detecting that the client device is within a wireless communication range of the industrial device and is authorized to access the data item.

11. A method for delivering industrial data to a graphical interface, comprising:
in response to receiving a request from a client device for a data item stored on an industrial device comprising a processor:
 selecting, by the industrial device, presentation metadata for the data item, wherein the selecting is based on data mapping information stored on the industrial device and defining associations between data items stored on the industrial device and respective graphical formats, and the presentation metadata identifies a graphical format, of the graphical formats, for presentation of the data item on the client device based on the associations,
 generating, by the industrial device, a data packet comprising a value associated with the data item and the presentation metadata, and
 sending, by the industrial device, the data packet to the client device,
wherein the industrial device is at least one of an industrial controller, a motor drive, a meter, a telemetry device, a vision controller, an industrial robot controller, or an optical sensor.

12. The method of claim 11, further comprising:
receiving, by the industrial device, user input data defining a presentation format for at least one of the data items; and
generating, by the industrial device, the data mapping information based on the user input data.

13. The method of claim 12, further comprising rendering, on the client device or another client device, a configuration interface configured to receive the user input data via interaction with the configuration interface.

14. The method of claim 13, wherein the receiving the user input data comprises:
  displaying the data items on the configuration interface,
  receiving, as a first subset of the user input data via interaction with the configuration interface, data item selection input identifying one of the data items,
  displaying, on the configuration interface, indications of available display formats for the one of the data items, and
  receiving, as a second subset of the user input data via interaction with the configuration interface, format selection input identifying one of the available display formats to be association with the one of the data items.

15. The method of claim 11, wherein
  at least a portion of the data mapping information defines an association between a data type and one of the graphical formats, and
  the selecting comprises selecting the presentation metadata based on the association and a determination that the data item corresponds to the data type.

16. The method of claim 11, wherein
  at least a portion of the data mapping information defines
    a data item group comprising a subset of the data items, and
    an identified graphical format, of the graphical formats, associated with the group, and
  the selecting comprises selecting the presentation metadata based on a determination that the data item is one of the subset of the data items included in the data item group.

17. The method of claim 11, wherein the selecting the presentation metadata comprises selecting, as the graphical format, at least one of a graphical widget, a two-state indicator, or a pie-chart.

18. A non-transitory computer-readable medium having stored thereon instructions that, in response to execution, cause a system comprising a processor to perform operations, the operations comprising:
  in response to receiving a request from a client device for a data item maintained in a memory of an industrial device:
    determining presentation metadata to be associated with the data item based on data mapping information associated with the industrial device, wherein the data mapping information defines associations between data items and respective graphical objects, and
    sending the data item and the presentation metadata to the client device,
  wherein
    the presentation metadata identifies a graphical object, of the graphical objects, to be used to render the data item on the client device, and
    the industrial device comprises at least one of an industrial controller, a motor drive, a meter, a telemetry device, a vision controller, an industrial robot controller, or an optical sensor.

19. The non-transitory computer-readable medium of claim 18, wherein the operations further comprise:
  receiving user input data defining a presentation format for at least one of the data items; and
  generating the data mapping information based on the user input data.

20. The non-transitory computer-readable medium of claim 19, wherein the operations further comprise rendering, on the client device or another client device, a configuration interface configured to receive the user input data via interaction with the configuration interface.

* * * * *